Sept. 29, 1959     D. DAVIDOFF     2,906,964
BIAS POWER SUPPLY SOURCE
Filed May 10, 1956
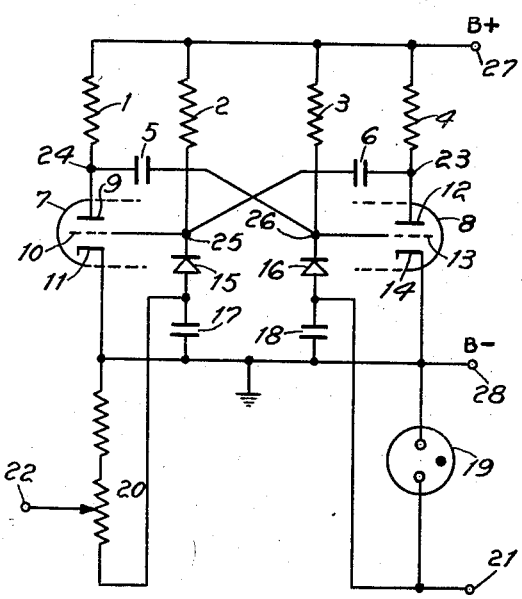
INVENTOR
*DORSEY DAVIDOFF*
BY
ATTORNEY

United States Patent Office 2,906,964
Patented Sept. 29, 1959

2,906,964
BIAS POWER SUPPLY SOURCE

Dorsey Davidoff, New York, N.Y., assignor to International Telephone and Telegraph Corporation, Nutley, N.J., a corporation of Maryland Application May 10, 1956, Serial No. 584,108

7 Claims. (Cl. 331—144)

The present invention relates to a plate-to-grid-coupled multivibrator circuit and more particularly to a circuit for developing a negative bias from a positive voltage potential input as is often necessary in the case of operating electronic equipment from a D.C. generator.

Various devices for developing a negative grid bias are well known to the art such as a potentiometer forming part of a cathode circuit or using some form of transformer-rectifier circuit. Many of these devices are not adaptable to circuits operating with a D.C. input or generator. Others of these devices lack desirability in that the bias developed is of a fluctuating nature depending for instance on an anode circuit current in class B and C stages, although other devices employing such means have derived the bias from a preceding amplifying stage where a tube was operated over the stable portion of its characteristic to help overcome the fluctuation.

An object of this invention is to provide a modification, employing relatively few circuit components, of a conventional plate-to-grid-coupled multivibrator which is capable of providing a bias power supply source which can be regulated.

A second object of this invention is to provide a unregulated negative voltage source which can be varied according to the value needed and, as above, employing a simply modified conventional multivibrator.

The applicant's circuit functions as a conventional multivibrator excepting that advantage is taken of the voltage collapse that occurs in the normal flip-flop operation of the multivibrator function and from this voltage collapse a negative bias is developed, stored and regulated.

According to the main feature of the present invention, the negative voltage is derived and maintained by charging a condenser connected between ground and grid of each triode in the multivibrator. The charge is negative with respect to ground and can be either maintained at a predetermined negative value by a voltage regulator connected across the charged condenser and the cathode or provision can be made for tapping a negative voltage value from a voltage divider connected across the cathode and the charged condenser. The above-mentioned and other features and objects of this invention will become more apparent by reference to the following description taken in conjunction with the sole figure of the drawing, which shows a schematic diagram of the circuit.

In the drawing the schematic diagram represents a conventional multivibrator. Tubes 7 and 8 represent halves of a double triode tube: The anodes 9 and 12 are connected to B+ respectively through resistances 1 and 4. The grids 10 and 13 are connected respectively to B+ through resistances 2 and 3. Grids 10 and 13 are coupled respectively to anodes 12 and 9 through condensers 6 and 5 and are connected respectively to B— through diodes 15 and 16 in series respectively with condensers 17 and 18. The cathodes 11 and 14 are connected directly to B—. Voltage regulator 19 is connected between B— at cathode 14 to a point between condenser 18 and diode 16 while voltage divider 20 is connected between B— at cathode 11 to a point between condenser 17 and diode 15. The negative voltage output terminals are found at 21 and 22, while the input terminals are represented at 27 and 28.

In the figure the circuit operates as a conventional multivibrator, points 23 and 24 respectively having a diminished voltage value when its associated tube is conducting and reflecting that potential to cut off the opposite side. Condensers 5 and 6 respectively are charged during the conduction of the opposite side and discharge when their associated tube conducts. Condensers 17 and 18 respectively receive a charge with the discharge of condensers 6 and 5 respectively through diodes 15 and 16. After charging condensers 17 and 18, the current flow from condensers 6 and 5 respectively continues through resistances 2 and 3 while points 25 and 26 respectively approach the cut-off points of tubes 7 and 8 and initiates conduction in the non-conducting tube. Diodes 15 and 16 trap the respective charge on the condensers 17 and 18 and thereby set up a potential at each of these condensers which is negative to ground. Output terminal 21 is kept at a steady negative value by voltage regulator 19; output terminal 22 is a variable tap to determine an unregulated negative value across voltage divider 20.

It can readily be seen that a pair of voltage regulators could be used instead of one regulator and one voltage divider as shown in the figure or, in like fashion, two voltage dividers.

While I have described above my invention in connection with specific apparatus, it is to be clearly understood that this description is made only by way of example and not as a limitation to the scope of my invention as set forth in the object thereof and in the accompanying claims.

I claim:

1. In a plate-to-grid-coupled free-running multivibrator circuit having a pair of electron discharge devices each including an anode, grid and cathode; a condenser, a rectifier having forward and backward current flow terminals, first circuit means directly series coupling said forward terminal only to said condenser, second circuit means coupling said backward terminal directly in series with one of said grids, and an output terminal means coupled in direct series to said first circuit means.

2. A plate-to-grid-coupled multivibrator circuit according to claim 1, wherein there is further included a voltage regulator and circuit means directly shunt connecting said voltage regulator across said condenser.

3. In a plate-to-grid-coupled free-running multivibrator circuit having a pair of electron discharge devices each including an anode, grid and cathode; two condensers, two rectifiers, each of said rectifiers having respectively forward and reverse current flow terminals, first circuit means coupling respectively each of said condensers in direct series to an associated one of said forward terminals only, second circuit means coupling respectively each of said reverse terminals in series with an associated one of said grids, a first output terminal means coupled directly to one of said forward terminals and a second output terminal means coupled through a voltage divider directly to the other of said forward terminals.

4. In a plate-to-grid-coupled free running multivibrator circuit having a pair of electron discharge devices each including an anode, grid and cathode; two condensers, two rectifiers, each of said rectifiers having respectively forward and reverse current flow terminals, first circuit means coupling respectively each of said condensers in direct series to an associated one of said forward terminals only, second circuit means coupling respectively each of said reverse terminals in series with an associated one of said grids, a voltage regulator and a voltage divider, a first output terminal means coupled across said voltage regulator and one of said forward terminals, a second output terminal means coupled through said voltage divider to the other of said forward terminals.

5. A system for developing a regulated negative voltage bias from a positive voltage input comprising a free-running plate-to-grid coupled multivibrator circuit, said multivibrator circuit having a pair of electron discharge devices each including an anode, grid and cathode; a first and second reference potential source, a condenser with a first and second plate having said first plate directly series coupled to said first reference potential, a rectifier having a first and second terminal, said first terminal directly series connected to said condenser's second plate, one of said grids directly series coupled to said rectifier second terminal, voltage regulation means directly shunt connected across said condenser, and an output terminal means directly series coupled to said first rectifier terminal to provide a regulated negative bias output.

6. A system for developing a negative voltage bias from a positive voltage input comprising a free-running plate-to-grid coupled multivibrator circuit, said multivibrator circuit having a pair of electron discharge devices each including an anode, grid and cathode; a first and second reference potential source, a first and second condenser each having respectively a first and second plate with each of said first plates directly series coupled to said first reference potential, a first and second rectifier each having respectively a first and second terminal, said first terminals representing respectively the electron conducting direction of said rectifiers, each of said rectifier first terminals respectively coupled to one of said second plates of an associated one of said condensers, each of said grids respectively directly series coupled to an associated one of said rectifier second terminals, a voltage regulation means directly shunt connected across one of said condensers, an output means directly series coupled to the second plate of said first condenser, a voltage divider means directly shunt connected across said second condenser, and a second output means coupled to said voltage divider to provide a variable negative bias output.

7. In a plate-to-grid coupled free-running multivibrator circuit having a pair of electron discharge devices each including an anode, grid and cathode; a condenser, a rectifier having forward and backward current flow terminals, first circuit means directly series coupling said forward terminal to said condenser, second circuit means coupling said backward terminal in direct series with one of said grids, and a voltage divider output means having a variable tap shunt connected across said condenser to provide a variable negative bias.

References Cited in the file of this patent

UNITED STATES PATENTS

| | | |
|---|---|---|
| 2,423,931 | Etter | July 15, 1947 |
| 2,556,934 | Mulligan et al. | June 12, 1951 |
| 2,587,175 | Lappin | Feb. 26, 1952 |
| 2,644,917 | Smith | July 7, 1953 |
| 2,704,330 | Marker | Mar. 15, 1955 |
| 2,748,272 | Schrock | May 29, 1956 |

OTHER REFERENCES

"Waveforms" by Chance et al., vol. 19, McGraw-Hill, 1949 ed., page 193.